United States Patent [19]

Kenway

[11] Patent Number: 4,678,879

[45] Date of Patent: Jul. 7, 1987

[54] PANEL MOUNTED APPARATUS WITH FRONT OPERATED CLAMPING MEANS

[75] Inventor: Sidney Kenway, Fountain Valley, Calif.

[73] Assignee: Eaton Corporation, Cleveland, Ohio

[21] Appl. No.: 827,997

[22] Filed: Feb. 10, 1986

[51] Int. Cl.⁴ .............................................. H01H 13/04
[52] U.S. Cl. .................................... 200/295; 200/296; 248/27.3
[58] Field of Search ............... 200/296, 295; 248/27.1, 248/27.3, 295.1, 603, 604; 24/525

[56] References Cited

U.S. PATENT DOCUMENTS

| | | | |
|---|---|---|---|
| 3,134,467 | 5/1964 | Blyth | 248/27.3 |
| 3,233,299 | 2/1966 | Godel | 248/27.1 |
| 3,273,836 | 9/1966 | Hallerberg | 248/27.1 |
| 3,727,020 | 4/1973 | Bailey | 200/295 |
| 3,876,851 | 4/1975 | McMains et al. | 200/302.2 |
| 4,066,838 | 1/1978 | Fujita et al. | 248/27.1 |
| 4,372,509 | 2/1983 | Krainhofer | 248/27.1 |
| 4,454,397 | 6/1984 | Kim | 200/296 |

FOREIGN PATENT DOCUMENTS 2333988  8/1977  France .............................. 248/27.1

OTHER PUBLICATIONS

Electronic/Electrical Product News, Apr. 1985; Inside of cover sheet, "Sealed Illuminated Pushbuttons".

Primary Examiner—Stephen Marcus
Assistant Examiner—Renee S. Luebke
Attorney, Agent, or Firm—D. A. Rowe; L. G. Vande Zande

[57] ABSTRACT

A front mounted rectangular pushbutton switch is clamped within a hole in the panel by screws accessible through a front opening of the switch housing which drive an external clamping assembly against the rear of the panel at the midpoints of four sides of the switch housing. The clamping assembly employs two screws at diagonally opposed corners of the housing, each of which controls movement of a clamp on two adjacent sides of the switch.

5 Claims, 8 Drawing Figures

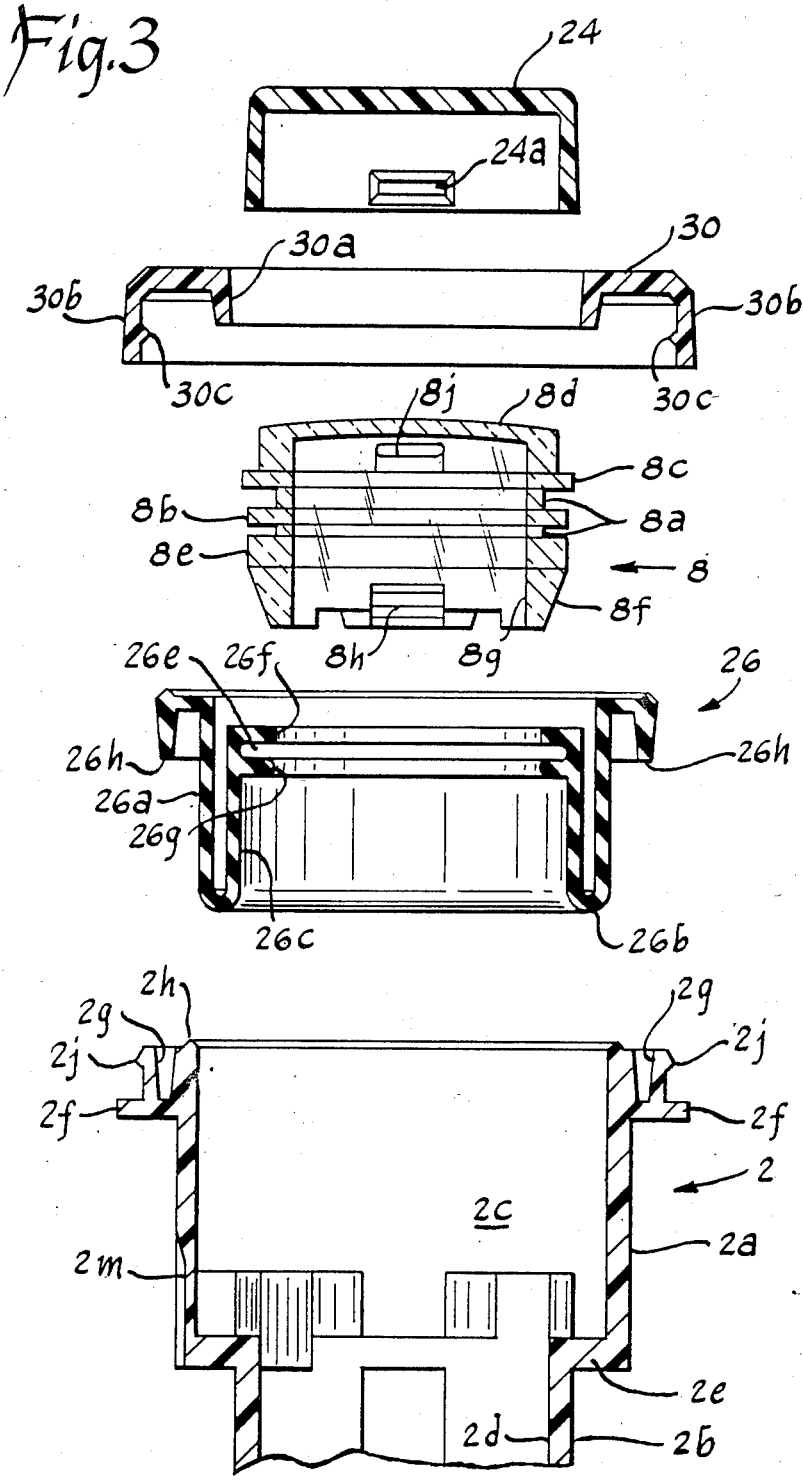

PANEL MOUNTED APPARATUS WITH FRONT OPERATED CLAMPING MEANS

CROSS-REFERENCE TO RELATED APPLICATION

This Application is related to copending Application entitled "Sealed Rectangular Pushbutton Switch" filed concurrently herewith in the name of Sidney Kenway and assigned to the assigned of this Application.

BACKGROUND OF THE INVENTION

This invention relates to apparatus which is mounted in a hole in a panel from a front side thereof and more specifically to such apparatus which may be clamped tightly to the panel to enable the juncture between device and panel to be sealed against the ingress of dust, fluids or the like.

Apparatus which is to be attached to a panel in a fluid tight or dust tight sealed manner by mounting means which are operable from the front of the panel usually require some form of clamping structure as opposed to a snapin mounting structure. To improve the integrity of the seal between the apparatus and the panel, it is preferable that the clamping structure provide a uniform clamping force against the panel. U.S. Pat. No. 3,876,851 discloses a device which provides a clamping force on four sides of the device to evenly distribute the clamping force, but such device requires a separate adapter and is mounted to the panel from the rear of the panel. Other devices are known in which the clamping mechanism is operated from the front side such as that disclosed in U.S. Pat. No. 3,233,299, but this device provides clamping force only at two opposed sides of the device. Another front mounted device is disclosed in U.S. Pat. No. 4,372,509, this device applying lateral clamping pressure against the edges of the panel opening, not a sealing force against the panel. Still another front mounted device is shown in U.S. Pat. No. 3,273,836 which applies localized clamping forces at two diagonally opposed corners of the device and does not distribute the forces uniformly around the device.

SUMMARY OF THE INVENTION

This invention provides apparatus adapted to be mounted through a hole in a panel and clamped to that panel from the front surface thereof by a clamping structure comprising diametrically opposed screws accessable through an open forward end of the apparatus, the screws extending exteriorly of the apparatus behind the panel, each of the screws receiving a nut having a pair of arms disposed at right angles outwardly from a central hub threadably engaged with said screws, the arms engaging a housing of the apparatus to prevent rotation of the nut with respect to the screw and being linearly movable forward and backward along the housing in response to respective rotation of said screws, each arm having a clamping strap connected thereto at essentially the midpoint of the respective side of the apparatus for extending toward said panel, the clamping straps being disposed within recessed portions of the apparatus housing in one position and being cammed outwardly away from the apparatus housing as the nuts are moved forwardly toward the panel in response to the screw rotation for causing the ends of the clamping straps to engage the rear surface of the panel to clamp the housing tightly thereagainst.

The invention, its advantages and features will be more readily understood when reading the following specification and claims in conjunction with the accompanying drawings.

BRIEF DESCRIPTION OF THE DRAWINGS

FIG. 3 is an exploded view in cross section of a forward portion of the housing of the switch of FIGS. 1 and 2, a formed flexible seal, an actuator extension member, a bezel and a pushbutton cap;

DESCRIPTION OF THE PREFERRED EMBODIMENTS

Figure 7:
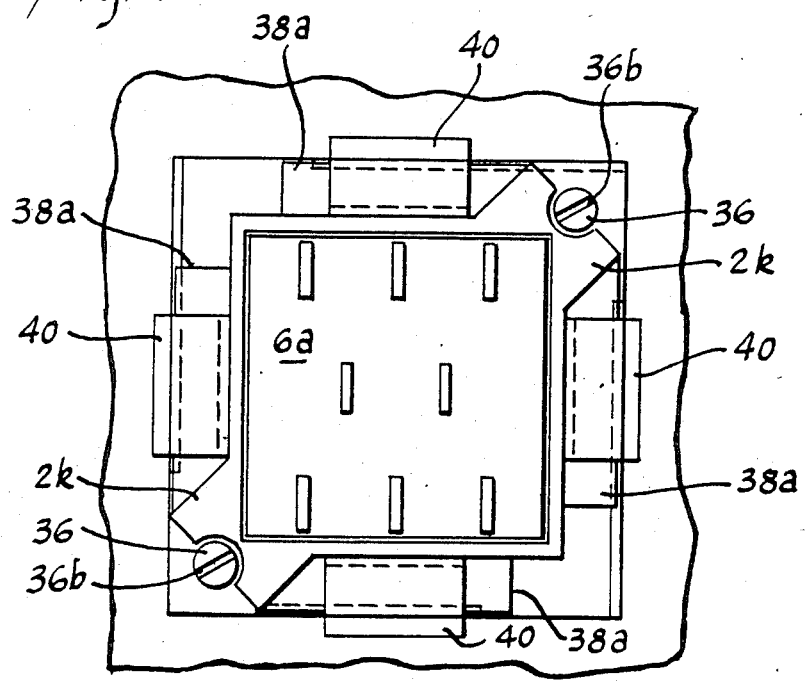
FIG. 7 is a bottom plan view of the switch as shown in FIG. 5.

The device of this invention comprises a pushbutton switch having a hollow rectangular housing 2 for receiving a molded actuator 4 and a molded switch base 6 therein. The transverse profile of the switch is essentially square as may be seen in FIGS. 7 and 8. The switch is a double pole device having a contact switching mechanism 10 located along opposite side walls of the housing. The center portion of the switch is essentially open and may contain a lamp structure if desired to provide an illuminated switch.

Figure 1:
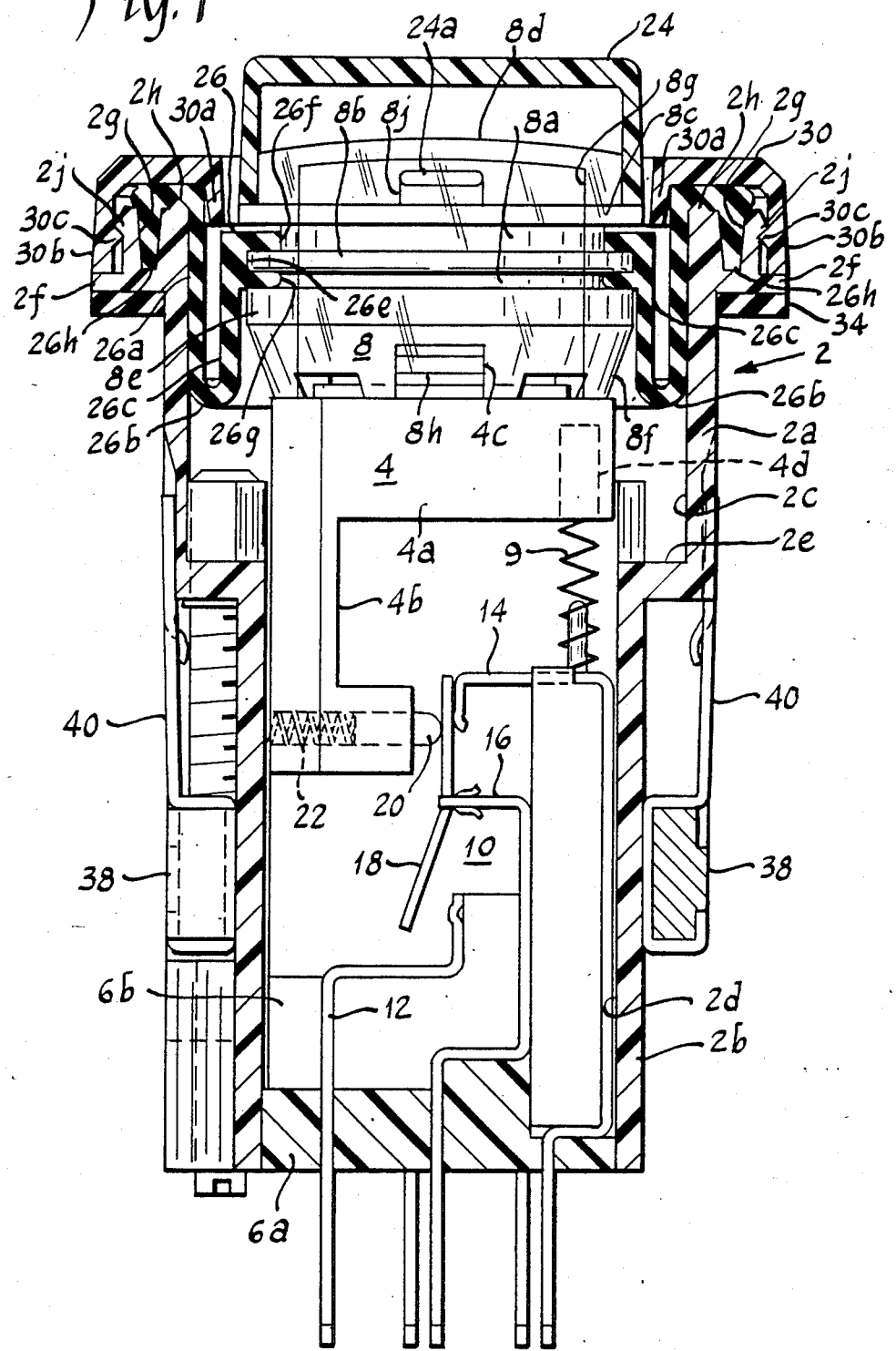
FIG. 1 is a longitudinal cross sectional view of a pushbutton switch constructed in accordance with this invention.

Actuator 4 comprises a molded platform 4a which is essentially square in a transverse plane of the switch and has a pair of contact actuator legs 4b (only one of which is shown in the drawings) projecting downwardly at diagonally opposite corners thereof. Actuator 4 has a pair of upstanding hooks 4c molded integrally with the upper surface of platform 4a for providing snap-fit attachment with an actuator extension member 8. The underside of platform 4a has a pair of diagonally located cylindrical recesses or blind holes 4d (only one of which is shown in FIG. 1) which are open to the under side of the platform 4a for receiving helical springs 9 therein. Springs 9 rest upon the upper surface of base 6 to bias actuator 4 upwardly as viewed in the drawings toward a forward end of the switch.

The base 6 is a two-part assembly having a molded header 6a and a molded terminal block 6b which may be snapfit together or be secured together by an adhesive or the like. The opposed lateral surfaces of support block 6b are configured to receive and mount the stationary contactterminal members 12 and 14 and movable contact supportterminal member 16 in the positions shown in FIGS. 1 and 2. A rocking contactor 18 is pivotally supported upon the end of stationary supportterminal member 16 for alternate rocking engagement with stationary contacts 12 and 14. A spring biased plunger 20 is carried within a cylindrical hole in the lower portion of the respective actuator leg 4b and is biased by a spring 22 into engagement with the surface of rocking contactor 18. Translation of the plunger 20 across the plane of support terminal member 16 in response to linear reciprocal movement of actuator 4 causes contactor 18 to rock from the position shown in FIG. 1 wherein it electrically bridges stationary contact 14 and center support terminal 16 to the position shown in FIG. 2 wherein it electrically bridges stationary contact 12 with center support terminal 16. The switch is similar to that shown and claimed in U.S. Pat. No. 4,383,149 issued May 10, 1983 to Edward Fulton and assigned to the assignee of this Application, which patent is incorporated herein by reference and which may be referred to for additional details of the switch.

Actuator extension 8 is a transition member which provides a cylindrical sealing surface 8a between a rectangular pushbutton cap 24 and the rectangular actuator platform 4a. Cylindrical sealing surface 8a has a raised annular rib 8b thereon. At the forward end of cylindrical surface 8a, extension 8 comprises a rectangular platform 8c which has an upstanding domed lens portion 8d, the transverse provile of lens portion 8d also being rectangular. The rear of innermost end of extension 8 comprises an enlarged cylindrical section 8e essentially the same diameter as raised annular rib 8b and a frustoconical section joining cylindrical section 8e to a reduced diameter which is essentially equal to the transverse dimensions of rectangular platform 4a. Extension 8 is provided with a cylindrical recess 8g open to the rear end thereof and is preferably formed of a transparent material to serve as a light transmitting lens member if the switch is to incorporate a lamp in the open central cavity. The surface of recess 8g is provided with notches 8h at diametrically opposed points which cooperatively engage with the upstanding tabs 4c to connect the extension 8 to the actuator 4 with a snap fit. The exterior surface of lens portion 8d is provided with recesses 8j for receiving projections 24a formed on interior surfaces of pushbutton cap 24 to thereby attach cap 24 to extension 8 with a snap fit.

Molded insulating housing 2 comprises a forward portion 2a having a rectangular, essentially square transverse profile of a first dimension and a rear end portion 2b having a rectangular, essentially square transverse profile of a second, reduced dimension with respect to the forward portion 2a, the two portions joining at a transverse shoulder 2e intermediate the ends of the insulating housing. Front portion 2a has a rectangular cavity 2c and rear portion 2b has a rectangular cavity 2d. The forward end of housing 2 is enlarged with respect to the transverse profile of forward section 2a and comprises an outwardly projecting flange 2f and a groove 2g which is open to the forward end of the housing and extends around the periphery of cavity opening 2c. The triangular shaped raised rib 2h extends peripherally around the opening 2c at the forward surface of the housing between the opening 2c and the groove 2g. Lateral surfaces of the forward end of housing 2 are provided with latching surfaces 2j for attaching a bezel 30 as will be described hereinafter.

Figure 4:
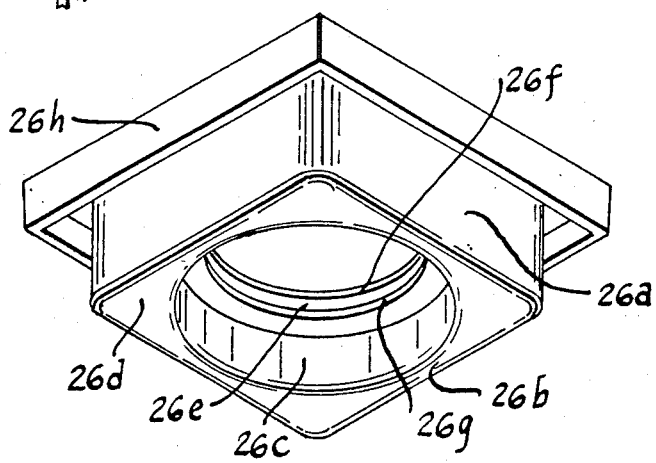
FIG. 4 is an isometric view of the flexible seal viewed from the rear.

A flexible seal 26 is provided between housing 2 and the elements comprising the depressible pushbutton operator. Seal 26 has a rectangular body portion 26a which closely conforms to the interior walls of housing 2 defining rectangular cavity 2c. The rearmost end of seal 26 is formed with a reflex bend 26b which joins to a cylindrical portion 26c which is centrally disposed within the rectangular body portion 26a. With reference also to FIG. 4, the reflex bend 26b is semicircular at the points where cylindrical portion 26c is tangential to rectangular body portion 26a. In the areas between these tangential points, the reflex bend is defined by a continuation of the radius of the semicircular section on both the rectangular and the cylindrical surfaces which are joined by short transverse areas which define a rear surface 26d. The forward end of cylindrical portion 26c terminates in a collar of increased thickness having an annular groove 26e which defines a pair of axially spaced circular openings 26f and 26g. The forward end of cylindrical portion 26c is stretched over the cylindrical sealing surface 8a of extension 8 such that the circular openings 26f and 26g engage the cylindrical sealing surface 8a on opposite sides of the raised annular rib 8b, the latter being received within the groove 26e. The circular openings 26f and 26g are made slightly smaller than the diameter of the cylindrical sealing surface 8a so that in the assembled position the seal is stretched snuggly over the sealing surface to form a good seal therewith which is devoid of corners associated with rectangular structures. The spaced circular openings 26f and 26g, the raised rib 8b and the groove 26e form a labyrinth to further enhance the sealing structure.

The forward end of rectangular body 26a of seal 26 overlies the forward end of the housing 2. In the preferred embodiment, the forward end of seal 26 includes a rearwardly extending skirt 26h which is peripherally spaced from body portion 26a. Skirt 26h is received within groove 2g of housing 2. A rectangular shaped bezel 30 of molded insulating material and having a rectangular central opening, is attached over the forward end of the switch housing 2 and the forward end of seal 26. Bezel 30 has a rearwardly extending inner wall 30a around the periphery of the central rectangular opening and a rearwardly extending outer peripheral wall 30b. The interior of outer wall 30b is provided with a plurality of projections 30c which cooperate with latching surfaces 2j on housing 2 to attach the bezel to the housing with a snap fit. When so attached, bezel 30 is pulled snuggly down upon the front surface of the seal 26, thereby elastically deforming the seal over the triangular raised rib 2h to enhance the sealed juncture between seal 26 and housing 2.

The reflex bend 26b joining rectangular body 26a and cylindrical portion 26c enables the seal to roll rearwardly in a small confined area when the actuator 4 is linearly moved rearwardly by depression of pushbutton operator cap 24. The semicircular bends 26b at the tangential points of cylindrical portion 26c to rectangular portion 26a truly roll along the interior surface of cavity 2c, whereas the areas between the tangential points which define rear surface 26d of the seal roll along the cylindrical portion but deflect along the rectangular portion.

Figure 5:
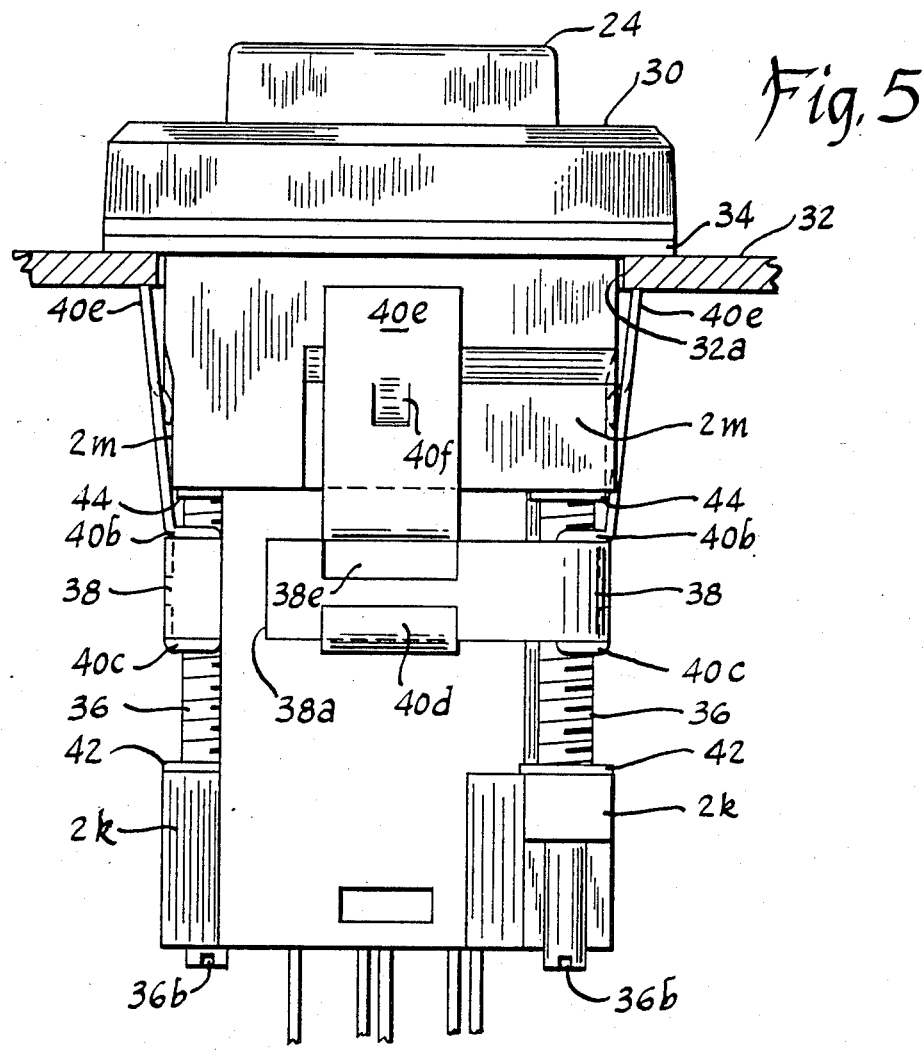
FIG. 5 is a side elevational view of the pushbutton switch of this invention showing that switch clamped to a panel by means of a clamping structure provided on the switch.
Figure 6:
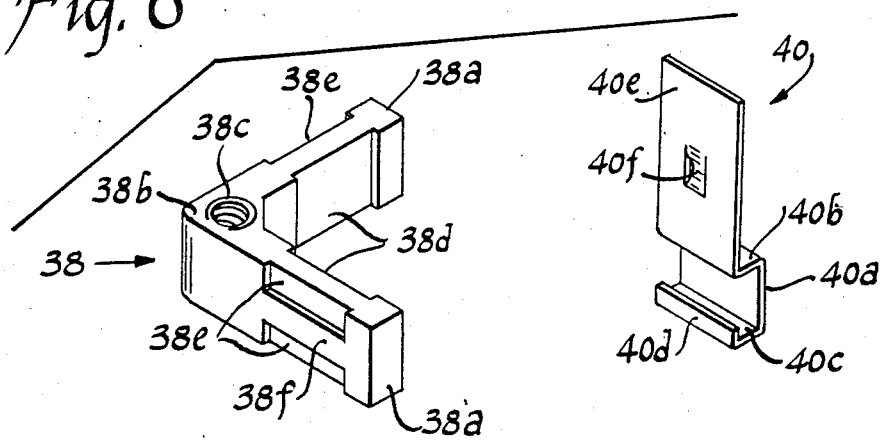
FIG. 6 is an exploded isometric view of one nut and one clamping strap of the clamping structure for the switch of this invention.
Figure 8:
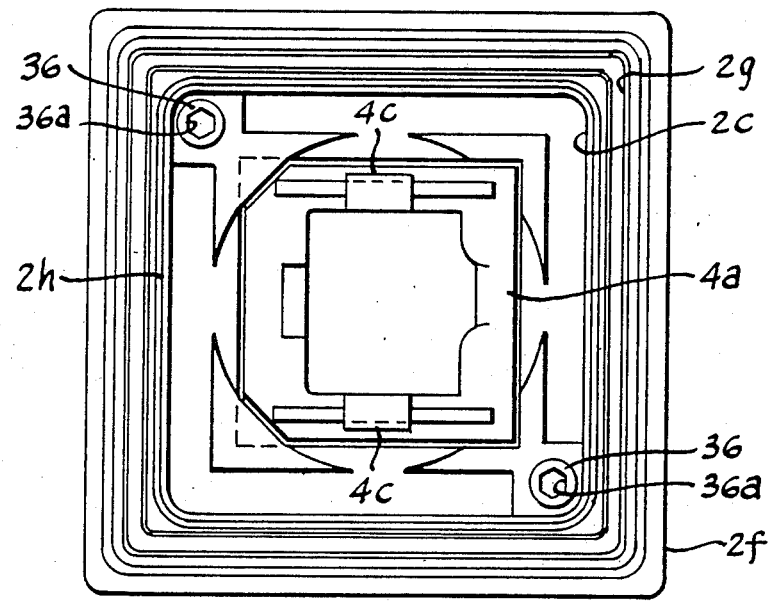
FIG. 8 is a top plan view of the switch of this invention with the flexible seal, actuator extension, operator cap and bezel removed.

The switch is adapted to be mounted in a sealed manner to a panel 32 which has a rectangular opening 32a conforming to the transverse profile of the forward end 2a of housing 2 and a flat, planar top and bottom surface area around the periphery of opening 32a. As seen in FIG. 5, the housing 2 is inserted through the opening 32a in panel 32 from the front of the panel (shown as the top of the panel in FIG. 5). A gasket 34 is disposed over the forward end 2a of housing 2 under the flange 2f of the forward end of housing 2, and the gasket and flange abut the forward surface of panel 32 along the periphery of the opening 32a. Referring also to FIG. 8, switch housing 2 has a pair of screws 36 journaled for rotation in diagonally opposite corners of the rectangular cavity 2c. The screws 36 project through the transverse shoulder 2e joining forward portion 2a and rear portion 2b of housing 2 to extend rearwardly along the exterior of rear portion 2b at diagonally opposed corners thereof. As seen best in FIGS. 5 and 7, rear housing portion 2b has a pair of bearing blocks 2k molded integrally with the housing at diagonally opposed corners for rotatably journaling the rear ends of screws 36.

Each of the screws 36 receives a clamping assembly comprising a V-shaped nut 38 and a pair of clamping straps 40. The nuts 38 are preferably die cast aluminum members having a pair of arms 38a joined at right angles at an apex or hub 38b. A threaded hole 38c is provided through the apex or hub 38b. The outer ends of the arms 38a have shallow relief channels 38d formed on the interior surfaces and a pair of recesses 38e formed on the outer surfaces opposite the channel 38d. The recesses 38e are formed only part way into the respective arms from the upper and lower surfaces thereof leaving a web of material 38f therebetween. The clamping straps 40 comprise a resilient spring material, one end of which is formed into a hook shape to be secured over a respective arm 38a or nut 38. The hook shaped end of clamping strap 40 comprises a C-shaped channel having a vertical wall 40a and opposed upper and lower transverse walls 40b and 40c, respectively. The outer end of lower wall 40c is turned vertically upwardly essentially parallel with wall 40a. The other end of upper wall 40b is similarly turned upwardly to form a vertically extending leg 40e which extends substantially parallel to wall 40a. Leg 40e is provided with a sheered offset cam surface 40f for purposes that will be described hereinafter. The straps 40 are attached to the respective arms 38a of nuts 38 by hooking a leg 40d within a respective recess 38e such that leg 40a is disposed within an adjacent channel 38d. Leg 40b is deflected slightly to enable it to be inserted over the top surface of the respective leg 38a to securely lock the strap 40 to the nut 38.

The clamping assemblies are provided at the respective diagonally opposed corners of rear portion 2b of switch housing 2 and screws 36 are threadably inserted into the openings 38c of the nuts 38. The rearmost ends of screws 36 have a reduced diameter which is rotatably supported within the bearing block portion 2k of housing 2. A washer 42 is disposed over the reduced diameter end of screw 36 to rest upon a forward surface of bearing block 2k. A C-shaped snap ring 44 is inserted into a groove (not shown) in the respective screws 36 adjacent transverse shoulder 26 to cooperate with the washers 42 in fixing the forward and rearward movement of screws 36 with respect to the housing 2. The arms 38a of nuts 38 are disposed along a pair of adjacent sides of rear end housing portion 2b to slide along the flat surface thereof and prevent rotation of the nut 38 with respect to the housing. The length of arms 38a and the position of recesses 38d and 38e to define the position of straps 40 is predetermined to place each strap 40 at the midpoint of each respective side of the housing. The screws 36 are provided with recessed hexagonal openings 36a at their forward ends for engagement by a hexogonally shaped drive tool such as an Allen wrench or the like, and are provided with slots 36b at the rear ends for engagement with a flat bladed screwdriver or similar tool. Rotation of the screws 36 from either end causes the nuts 38 to move longitudinally along the housing portion 2b in either the forward or rearward direction according to the respective rotations.

Figure 2:
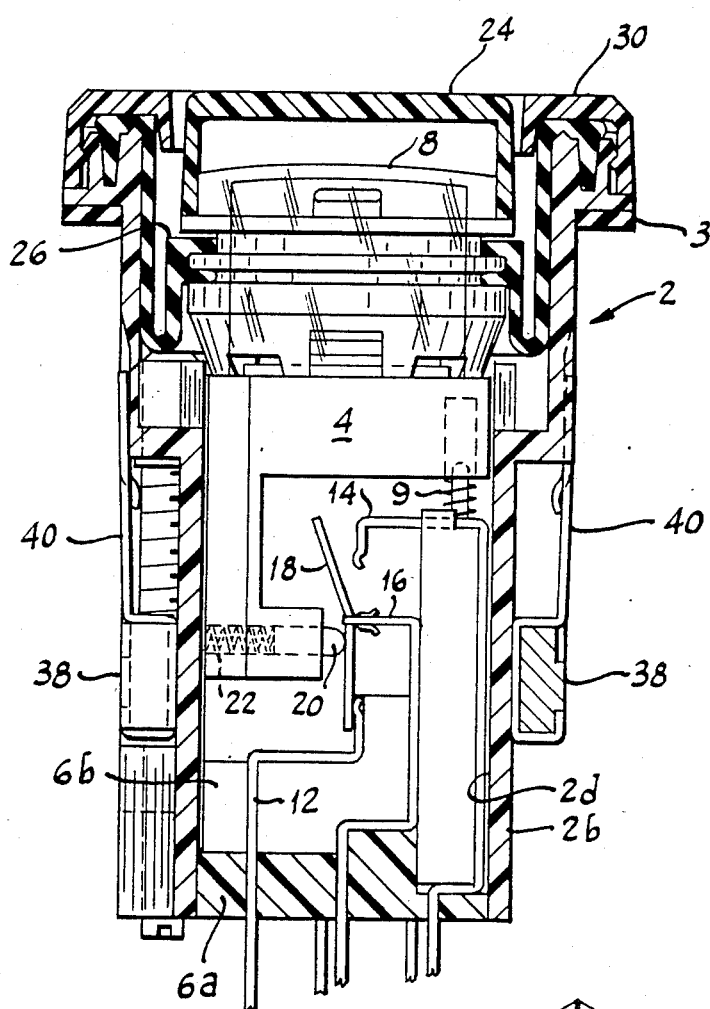
FIG. 2 is a view similar to FIG. 1 drawn to a reduced scale and showing the pushbutton operator of the switch moved to a depressed position.

The exterior surface of forward end 2a of housing 2 is provided with a recess 2m on each of the respective sides thereof. As seen in FIG. 1 and 2, when the nuts 38 are in their rearwardmost position adjacent the forward surfaces of bearing blocks 2k, the forward ends of legs 40e of the straps 40 are received within the recess 2m such that the straps 40 are flush with the exterior surface of housing portion 2a. In that position, the straps 40 provide no interference with insertion or removal of the housing 2 from the panel 32. When the housing is inserted within the opening 32a of the panel and it is desired to attach the housing thereto, access to the screws 36 may be had by removing the bezel 30, seal 26, and extension 8 from the forward end of the switch. Then using the proper tool, the screws 36 may be rotated to cause nuts 38 to move forwardly along the housing. Such movement causes cam surfaces 40f to engage the transverse shoulder 2e of the housing 2 to cam the forward ends of legs 40e of straps 40 laterally outwardly of the housing to engage the rear surface of panel 32 adjacent the opening 32a. The switch may be tightly clamped against the panel by the desired amount of pressure applied to the rotation of screws 36. Clamping pressure from a respective screw 36 is applied to two adjacent sides of the four sides of the switch device at the midpoint of each of the sides and is evenly distributed to the ends 40e of straps 40 at these two sides. By applying substantially equal rotational force to the two screws, an evenly balanced clamping force is provided at the midpoints of the four sides of the switch to provide good sealing engagement between the flange 2f and the panel 32 by virtue of the gasket 34. With the switch housing in place on the panel, the extension 8 and seal 26 may be reassembled over the open forward end of the switch and secured thereto by snapping bezel 30 over the seal 26 to the lateral walls of the forward end of housing 2.

Thus the foregoing has described a preferred embodiment of a panel mounted device such as a pushbutton switch which may be mounted to the panel from the front of the panel which provides an improved sealed juncture between the switch and the panel. It is to be understood that the invention is capable of various modifications without departing from the scope of the appended claims.

I claim:

1. Apparatus adapted to be front mounted to a panel through a hole in said panel comprising, in combination:
    a rectangular housing comprising a forward end having a transverse profile larger than said hole in said panel, an intermediate portion having a tranverse profile substantially corresponding to said hole in said panel, and a rear portion having a reduced transverse profile relative to said intermediate portion, said housing being open to said forward end;
    a pair of screws rotatably supported within said intermediate portion of said housing at diagonally opposed locations and extending rearwardly along diagonally opposed corners of said rear portion exteriorly thereof, said screws having tool engagable drive means accessible through said open forward end of said housing;
    a pair of nuts each comprising a pair of arms joined together at a right angle at an apex and having a threaded opening for receiving a respective one of said screws in said apex, said arms engaging exterior surfaces of respective adjacent sides of said rear portion of said housing for preventing rotation of said nuts, and said nuts being movable forwardly and rearwardly along said exterior surfaces of said rear portion of said housing in response to rotation of said screws;

a plurality of clamping straps, respective ones of said straps being affixed to a respective arm of said nuts at a midpoint of a respective side of said housing and extending forwardly along said exterior surface of said rear portion of said housing and within respective recesses in exterior side surfaces of said intermediate portion of said housing; and cam means on each said clamping strap cooperable with said intermediate portion of said housing upon forward movement of said nuts for deflecting said clamping straps outwardly of said intermediate portion of said housing;

said apparatus being insertable through said hole in said panel wherein said forward end abuts a front face of said panel adjacent said hole, said intermediate portion is located in said hole, and forward ends of said clamping straps are deflected outwardly of said intermediate portion of said housing and drawn into engagement with a rear surface of said panel at a midpoint of each of four respective sides of said rectangular housing upon appropriate rotation of said screws for clamping said device to said panel.

2. The invention defined in claim 1 wherein said rear end of said housing is provided with laterally projecting bearing blocks for journalling rear ends of said screws.

3. The invention defined in claim 2 wherein said nuts are threadably received on said screws between said bearing blocks and said intermediate portion of said housing.

4. The invention defined in claim 3 wherein a transverse profile encompassing said bearing blocks, nuts and clamping straps when in an undeflected position, is within or coincident with said transverse profile of said intermediate portion.

5. The invention defined in claim 4 wherein second tool engagable drive means are provided at said rear ends of said screws.

* * * * *